Patented June 1, 1954

2,680,124

UNITED STATES PATENT OFFICE 2,680,124

REACTION PRODUCTS OF ALIPHATIC DIHYDRIC ALCOHOLS WITH ALICYCLICTRICHLOROSILANES

Marvin C. Brooks, Packanack Lake, and Roswell H. Ewart, Bloomfield, N. J., assignors to United States Rubber Company, New York, N. Y., a corporation of New Jersey No Drawing. Application January 23, 1952, Serial No. 267,908

5 Claims. (Cl. 260—448.8)

This invention relates to the reaction product of unsaturated alicyclic trichlorosilanes such as cycloalkenyltrichlorosilanes and cycloalkenylalkyltrichlorosilanes, with aliphatic dihydric alcohols.

We have found that cycloalkenyltrichlorosilanes and cycloalkenylalkyltrichlorosilanes can be caused to react with aliphatic dihydric alcohols to give reaction products which are valuable new chemicals having a unique combination of chemical and physical properties. Upon hydrolysis, these reaction products form silicone resins; if the hydrolysis is carried out while the reaction products are in contact with a hydrated surface, they form silicone films bound to the surface.

The principal object of the present invention is to convert cycloalkenyltrichlorosilanes and cycloalkenylalkyltrichlorosilanes to derivatives which lack certain disadvantages attendant upon the use of these unsaturated alicyclic trichlorosilanes themselves. They are very corrosive and therefore difficult to package and relatively dangerous to ship. The reaction products of the present invention do not suffer from this disadvantage. When the unsaturated alicyclic trichlorosilanes are hydrolyzed, hydrogen chloride is evolved. The hydrogen chloride creates a health and corrosion hazard; it may also act as a catalyst for undesirable side reactions during the hydrolysis, or react chemically with other materials present and thereby cause undesirable results. By the use of the reaction products of the present invention these difficulties are avoided.

Another object of the present invention is to make available new materials which are particularly adapted for incorporation in rubber mixtures containing precipitated hydrated silica, precipitated hydrated calcium silicate or kaolin fillers, and which lend themselves to incorporation by ordinary rubber compounding techniques, using ordinary rubber processing equipment. These new materials cause unique improvement of the reinforcing properties of the aforementioned fillers in certain synthetic rubbers. Numerous other advantages of our invention will more fully appear.

We have discovered that the aliphatic dihydric alcohols will react with the unsaturated alicyclic trichlorosilanes, specifically the cycloalkenyltrichlorosilanes and cycloalkenylalkyltrichlorosilanes, to give valuable chemicals which are unique with respect to their ability to enhance the reinforcing properties of precipitated hydrated silica, precipitated hydrated calcium silicate and kaolin fillers in certain synthetic elastomers. According to our invention the aliphatic dihydric alcohols and the unsaturated alicyclic trichlorosilanes are reacted in such proportions that the ratio of alcoholic hydroxyl groups furnished by the aliphatic dihydric alcohol to the chlorine atoms furnished by the trichlorosilane is greater than 1:1 but preferably does not exceed 2:1. By the use of such a ratio we are enabled to obtain an ungelled reaction product and in most cases to obtain a reaction product which is a free-flowing liquid.

We have further found that if the ratio of alcoholic hydroxyl groups to chlorine atoms is greater than 1.5:1, the reaction product itself, in the absence of a solvent therefor, is a free-flowing liquid and therefore is eminently adapted to be directly incorporated in rubber-and-filler mixtures by the ordinary rubber compounding techniques.

It was very surprising to find that aliphatic dihydric alcohol-unsaturated alicyclic trichlorosilane reaction products prepared according to our invention were soluble, ungelled materials. On the basis of accepted theories of condensation polymerization, as set forth, for example, by Flory, J. A. C. S., volume 63, page 3083 (1942), one skilled in the art would predict that the condensation of a difunctional alcohol and a trifunctional acid, such as a trichlorosilane, would give a gelled product when the mole ratio of alcoholic hydroxyl groups to equivalents of acid, viz., the chlorine atoms supplied by the trichlorosilane, is not over 2:1. We have actually found, however, that the reaction products of our invention are free-flowing liquids when the mole ratio of alcoholic hydroxyl to chlorine is between 1.5:1 and 2:1, and that the reaction products are ungelled, soluble materials when the ratio is between 1:1 and 1.5:1, it being possible when using ratios between 1:1 and 1.5:1 to obtain a free-flowing liquid material by carrying out the reaction in the presence of a suitable proportion of an inert organic solvent. We prefer to use a solvent having a boiling point above 100° C., e. g., toluene or xylene, or a still higher boiling solvent, particularly those hydrocarbons which boil above 200° C. and are plasticizers for the rubber.

All of our reaction products are highly reactive, being particularly characterized by their reactivity with precipitated hydrated silica, precipitated hydrated calcium silicate and kaolin fillers. The rubber reinforcing properties of these fillers are markedly improved when they have been reacted with the reaction products of the present invention.

The unsaturated alicyclic trichlorosilanes which are employed in the practice of our invention are the cycloalkenyl- and cycloalkenylalkyltrichlorosilanes. We especially prefer those in which the cycloalkenyl group is cyclohexenyl. Examples are:

3-cyclohexenyltrichlorosilane
2-methyl-3-cyclohexenyltrichlorosilane
3-methyl-3-cyclohexenyltrichlorosilane
Beta-(3-cyclohexenyl)ethyltrichlorosilane
Beta - (4 - methyl-3-cyclohexenyl)propyltrichlorosilane.

The reaction between the dihydric alcohol and the unsaturated alicyclic trichlorosilane can be effected by merely commingling the two reactants under such conditions that they react with the liberation of hydrogen chloride, the hydrogen of the hydrogen chloride coming from the alcoholic hydroxyl groups and the chlorine coming from the alicyclic trichlorosilane. Provision should be made for removal of the hydrogen chloride as it is formed. This is most conveniently done by removing the hydrogen chloride as a gas from the reaction zone in ways well-known to those skilled in the art.

Alternatively, we can effect the reaction in the presence of a suitable hydrogen chloride acceptor or binder, usually an alkaline-reacting material, e. g., an alkaline earth carbonate, which neutralizes the hydrogen chloride immediately upon its formation, thereby forcing the reaction towards completion.

Typically we use a reactor provided with stirring means, means for heating, means for refluxing and a trap for removing the hydrogen chloride vapor. We charge the dihydric alcohol to this reactor and then gradually add the silane thereto with agitation and with refluxing of the evolved vapors and continuous removal of the hydrogen chloride from the system. The reaction is initiated spontaneously with evolution of heat and hydrogen chloride. When addition of the silane is complete, we heat the reaction mixture to an elevated temperature, e. g., 200° C., to complete the reaction. Completion of the reaction is attained when all of the chlorine in the silane has been converted to hydrogen chloride. The reaction product is then ready for use.

It is not essential that an organic solvent for the unsaturated alicyclic trichlorosilane be present during the reaction, although such a solvent can be used in conducting any of the reactions of our invention.

The reaction is carried out at an elevated temperature which can range from 50° to 250° C. but commonly ranges from 150° to 225° C. Since the dihydric alcohol and the alicyclic trichlorosilane react together exothermically while they are being commingled, a considerable portion of the reaction occurs during the period of intermixing. When a solvent is employed we carry out the balance of the reaction at the refluxing temperature of the mixture, at atmospheric pressure.

Throughout the reaction we prefer to agitate the reaction mixture and to condense and return thereto the readily condensible portion of the vapors evolved, by means of conventional refluxing equipment, while removing the uncondensed portion of the vapors from the system. This uncondensed portion is mainly hydrogen chloride, which if desired, can be contacted with an alkaline material to neutralize it and simplify its disposal.

To recapitulate, in order to obtain free-flowing liquid reaction products, i. e., reaction products which intrinsically and without the presence of a solvent are free flowing liquids, we find that it is essential to use relative proportions of dihydric alcohol and the alicyclic trichlorosilane such that the ratio of alcoholic hydroxyl groups to chlorine atoms is greater than 1.5:1. This ratio can range upwardly to as high as 2:1. In general, a ratio greater than 2:1 should not be used because the excess of dihydric alcohol above the 2:1 ratio does not combine chemically and serves merely to dilute the reaction product. Because dihydric alcohol is an expensive diluent, we much prefer to employ equivalent ratios not greater than 2:1.

As previously indicated, we can, although less preferably, employ the reactants in such proportions that the ratio of alcoholic hydroxyl to chlorine atoms is between 1:1 and 1.5:1. In this case commercially usable materials can be made provided that the reaction is carried out in the presence of a solvent capable of dissolving both the alicyclic trichlorosilane and the reaction products. If the reaction is carried out at such ratios in the absence of a solvent for the silane and for the reaction products, the mixture of reaction products is extremely viscous, in fact so viscous that it is not feasible for commercial use. In addition, the evolution of the hydrogen chloride gas during the reaction causes excessive foaming because of the high viscosity and foam retentiveness of the reaction mixture. Moreover, the problem of securing adequate heat transfer to the interior of the body of the reaction mixture obtained at such equivalent ratios is extremely serious and precludes use of such ratios on a commercial scale. In order to obtain a commercially usable material with a ratio of alcoholic hydroxyl groups to chlorine atoms of between 1:1 and 1.5:1, we can use any inert organic solvent but we prefer to employ a solvent having a boiling point greater than 100° C. so as to enable a suitable elevated reflux temperature. We can conveniently use hydrocarbons, e. g., toluene or xylene. We especially prefer to use high boiling hydrocarbon solvents (boiling above 200° C.) which are plasticizers for rubber; examples of these are the conventional coal tar softeners and the medium viscosity petroleum fractions commonly used for softening rubber. The reaction can be carried out in the presence of such rubber plasticizers or it can be carried in a lower-boiling solvent, typified by toluene or xylene, which is subsequently replaced with such hydrocarbon plasticizers for rubber.

We can use any aliphatic dihydric alcohol in practicing our invention. The dihydric alcohol is almost invariably saturated. Examples of saturated aliphatic dihydric alcohols which we may use are glycols such as ethylene glycol, propylene glycol, trimethylene glycol, any of the butylene glycols, etc., and the polglycols, which contain ether oxygen between carbon atoms in the chain, e. g., diethylene glycol, triethylene glycol, dipropylene glycol, etc.

The reaction products of our invention are valuable materials for compounding with certain synthetic rubbers containing precipitated hydrated silica, precipitated hydrated calcium silicate or kaolin fillers. The reaction products of our invention can be added to such rubber and filler mixtures on an ordinary rubber mill and caused to react with the filler to effect surface treatment thereof in such a way as to greatly improve the physical properties of the resulting vulcanizates.

The following examples illustrate the present invention:

Example 1

The reaction is carried out in a three-necked flask, provision being made for stirring, refluxing, and the drop-wise addition of the cyclohexenyltrichlorosilane. A trap is provided to remove the hydrogen chloride formed during the reaction period. One thousand, four hundred and thirty-six grams of 3-cyclohexenyltrichlorosilane are added dropwise to 1932 grams of diethylene glycol with continuous stirring of the mixture. The reaction commences almost immediately and is accompanied by the evolution of hydrogen chloride. After the addition of the cyclohexenyltrichlorosilane is completed, the temperature of the reaction mixture is slowly raised to about 180° C. and is held at that temperature for approximately one hour, i. e., until evolution of hydrogen chloride ceases. The reaction product is a colorless liquid weighing 2606 grams. The theoretical yield, assuming esterification of all the cyclohexenyltrichlorosilane, is 2638. The weights thus indicate that the reaction has gone substantially to completion.

Example 2

In an apparatus similar to that of Example 1, 215 grams of 3-cyclohexenyltrichlorosilane is added to 228 grams of propylene glycol. The reaction is carried out in a manner similar to that of Example 1. A transparent white liquid product weighing 347 grams is obtained. Since the theoretical yield is 335 grams, it is evident that the reaction has gone substantially to completion.

Example 3

In an apparatus similar to that of Example 1, 81.2 grams of beta-3-cyclohexenylethyltrichlorosilane is added to 95.6 grams of diethylene glycol. The reaction is carried out in a manner similar to that of Example 1. A light brown liquid product weighing 143 grams is obtained. Since the theoretical yield is 140 grams it is evident that the reaction has gone substantially to completion.

Example 4

Reaction products of 3-cyclohexenylthrichlorosilane and diethylene glycol are made up using different ratios of cyclohexenyltrichlorosilane and diethylene glycol. The method is similar to that of Example 1. Viscosities of the products thereby obtained, as measured by a Brookfield viscometer, are given below.

| Weight of diethylene glycol, g. | Weight of cyclohexenyltrichlorosilane, g. | Ratio of alcoholic hydroxyl groups to chlorine atoms | Viscosity or reaction product at 25° C. (in centipoises) |
|---|---|---|---|
| 71.8 | 95.6 | 1.8:1.0 | 760 |
| 71.8 | 85.0 | 1.6:1.0 | 4,000 |
| 71.8 | 79.7 | 1.5:1.0 | 28,000 |
| 71.8 | 77.0 | 1.45:1.0 | Solid |

It is apparent from these data that the ratio of alcoholic hydroxyl groups to chlorine atoms in the reaction mixture controls the viscosity of the product, and that free-flowing liquid products are obtained only when the ratio of hydroxyl groups to chlorine atoms is greater than 1.5 to 1.

Example 5

This experiment illustrates the preparation of soluble reaction products when the mole ratio of alcoholic hydroxyl groups to chlorine atoms is less than 1.5:1.

One hundred and fifty grams of toluene and 66.5 grams of diethylene glycol are charged into a reaction apparatus similar to that of Example 1. Eighty-five and one-half grams of 3-cyclohexenyltrichlorosilane are added to this mixture and the resultant mixture is heated to reflux temperature and held at this temperature for two hours. The reaction product thus obtained is quite fluid and on hydrolysis shows only traces of hydrogen chloride. This indicates that the reaction has gone substantially to completion.

When an attempt is made to remove the toluene from this reaction product the mixture becomes very viscous and thereby difficult to handle. All of the toluene cannot be removed because of foaming of the high viscosity residue.

When an attempt is made to prepare the reaction product with the ratio of reactants employed in Example 5 in the absence of solvent the reaction mixture becomes very viscous and the viscous mixture foams to such an extent that it is difficult to contain it in the reactor.

The reaction products of our invention are especially adapted for use with rubber-filler mixtures wherein the rubber is Butyl rubber, i. e. a rubbery copolymer of a major proportion, typically 80 to 99.5%, of isobutylene and a minor proportion, typically 20 to 0.5% of butadiene-1,3 or isoprene, the copolymer having an unsaturation below an iodine number of 50 and a molecular weight above 20,000 and being curable with sulfur to yield an elastic product. Details as to the use of our reaction products in rubber-filler mixtures are given in our copending application Serial No. 250,788, filed October 10, 1951.

From the foregoing description, many advantages of the present invention will be apparent to those skilled in the art. The principal advantage is that the invention makes available to the art new reaction products of unsaturated alicyclic trichlorosilanes with aliphatic dihydric alcohols, the reaction products being valuable chemical materials, being particularly valuable as rubber compounding ingredients for use in conjunction with synthetic elastomers containing silica, calcium silicate and kaolin fillers. By reacting the unsaturated alicyclic trichlorosilanes with the aliphatic dihydric alchohols, we produce materials which exhibit low volatility, which are free from corrosive tendencies and which may be shipped, handled and used without the disadvantages attending the alicyclic trichlorosilanes themselves. Our invention presents the advantage that the chlorine contained in the alicyclic trichlorosilane is removed in a separate reaction, yet the reaction products produced are capable of reacting in much the same way as alicyclic trichlorosilane itself. Numerous other advantages of the present invention will be apparent to those skilled in the art.

Having thus described our invention, what we claim and desire to protect by Letters Patent is:

1. The product formed by the reaction of an aliphatic dihydric alcohol selected from the group consisting of hydrocarbon diols and hydrocarbon ether-diols, and an alicyclic trichlorosilane selected from the group consisting of cycloalkenyltrichlorosilanes and cycloalkenylalkyltrichlorosilanes, under such conditions that hydrogen chloride is liberated, the ratio of alcoholic hydroxyl groups to chlorine atoms in the initial reaction mixture being greater than 1.0.

2. A product as set forth in claim 1 wherein said alcohol is diethylene glycol and said trichlorosilane is 3-cyclohexenyltrichlorosilane and wherein said ratio is greater than 1.5.

3. A product as set forth in claim 1 wherein said alcohol is diethylene glycol and said trichlorosilane is beta-(3-cyclohexenyl)ethyltrichlorosilane and wherein said ratio is greater than 1.5.

4. A product as set forth in claim 1 wherein said alcohol is propylene glycol and said trichlorosilane is 3-cyclohexenyltrichlorosilane and wherein said ratio is greater than 1.5.

5. A product as set forth in claim 1 wherein said alcohol is propylene glycol and said trichlorosilane is beta-(3-cyclohexenyl)ethyltrichlorosilane.

References Cited in the file of this patent

UNITED STATES PATENTS

| Number | Name | Date |
| --- | --- | --- |
| 2,441,066 | Hanford | May 4, 1948 |
| 2,574,390 | Hatcher | Nov. 6, 1951 |